US007257157B2

(12) United States Patent
Cheung (10) Patent No.: US 7,257,157 B2
(45) Date of Patent: Aug. 14, 2007

(54) METHOD OF AND SYSTEM FOR OPTIMIZING MODE SELECTION FOR VIDEO CODING

(75) Inventor: Gene Cheung, Tokyo (JP)

(73) Assignee: Hewlett-Packard Development Company L.P., Houston, TX (US)

( * ) Notice: Subject to any disclaimer, the term of this patent is extended or adjusted under 35 U.S.C. 154(b) by 895 days.

(21) Appl. No.: 10/253,886

(22) Filed: Sep. 25, 2002

(65) Prior Publication Data

US 2003/0086495 A1   May 8, 2003

(30) Foreign Application Priority Data

Sep. 25, 2001   (JP)  ............... 2001-291642

(51) Int. Cl.
*H04B 1/66*   (2006.01)
*H04N 7/12*   (2006.01)
(52) U.S. Cl. ............ 375/240; 375/240.01; 375/240.03; 375/240.13
(58) Field of Classification Search ........ 382/250–521, 382/232; 348/405–406, 407; 341/200; 375/240, 375/245, 240.01, 240.03, 240.25; 342/197
See application file for complete search history.

(56) References Cited

U.S. PATENT DOCUMENTS 4,748,626 A *   5/1988   Wong ......................... 714/746

6,043,844 A *   3/2000   Bist et al. .............. 375/240.24
6,167,162 A *   12/2000   Jacquin et al. .............. 382/251
6,804,294 B1 *   10/2004   Hartung et al. ............. 375/240

OTHER PUBLICATIONS

T. Wiegand, et al., "Rate-distortion optimized mode selection for very low bit rate video coding and the emerging h.263 statndard." IEEE Trans. on CSVT, Apr. 1996, vol. 6, No. 2 - pp. 1-25.
G. Sullivan and T. Wiegand, "Rate-distortion optimization for video compression," IEEE SP Magazine, Nov. 1998 - pp. 74-90.

* cited by examiner

*Primary Examiner*—Mohammed Ghayour
*Assistant Examiner*—Sophia Vlahos (57) ABSTRACT

Mode selection is optimized for video coding requiring sequencing of decisions with respect to a data block sequence. Each decision is selected from a mode set. The sequence is a directed acyclic dependency graph with depender blocks pointing to dependee blocks numbered in reverse topological order. A trellis state transition diagram is constructed from the reverse ordered graph. The least cost path through the trellis is determined to define the optimal decision modes selected from the set of modes at respective blocks. The number of trellis stages equals the number of decisions in the dependency graph from left to right. Each trellis stage has a varying number of states corresponding to cardinality of the mode set for the decision. The number of decisions to the left of a particular stage that the stage needs to remember equals the number of decisions to the right of the stage.

9 Claims, 6 Drawing Sheets

A Topological Order for QCIF (2 rows)

Figure 6

METHOD OF AND SYSTEM FOR OPTIMIZING MODE SELECTION FOR VIDEO CODING

TECHNICAL FIELD

The present invention relates to a method of and system for optimizing video coding, and more specifically to such a method and apparatus using directed acyclic graph based mode optimizing.

BACKGROUND ART

Video coding often includes making a sequence of loosely dependent election decisions, $M_i$'s, of some length N. Each decision $M_i$ involves selecting a "mode" from a mode set $m=\{m_1, \ldots, m_K\}$ of cardinality K. Loosely dependent means the cost, $C_i$, associated with each selection $M_i$, depends directly on $M_i$ and a small subset of dependent decisions $h_i=\{M_j, M_p, \ldots\}$. To optimize the decision a determination, is made of the optimal sequence of selections $M=[M_1, \ldots, M_N]$ that minimizes the sum, $$\sum_{i=1}^{N} C_i,$$

of costs, $C_i$. A general framework that solves optimization problems of this class is the corresponding optimization framework.

Two actual applications of the corresponding optimization framework are now considered.

One application of this optimization framework is referred to as the macroblock mode selection problem. Many popular video coding standards, such as MPEG 1/2/4 and H.263, employ a segmentation/multi-mode approach, in which a video frame is first divided into multiple sections called macroblocks. The macroblocks are coded sequentially in some predetermined order The coding method for each macroblock depends on the mode or the macroblock. Each macroblock mode is selected from a mode set; also each mode models a particular type of scene activity.

For example, in the case of the H.263 standard, a motion picture is expressed by a series of I-frames or I-pictures and P-frames or P-pictures. An I-frame is a frame that is coded by so called intra-frame coding while a P-frame is a frame that is coded by so called inter-frame coding. I-frames are coded independently from the other frames, and all the macroblocks in an I-frame are coded in a predetermined sequence, each with a coding mode referred to as Intra. In the Intra mode, the content of each macroblock is coded independently of any other macroblocks, and hence a particular macroblock is not dependent on any other macroblocks. Each macroblock of a P-frame is coded by one of the four modes: Intra, Inter, Skip, and Inter-4. Intra mode coding for a P-frame is the same as Intra mode coding for an I-frame. In the Inter mode, the content of a macroblock $X_t(i,j)$ of frame t and location (i,j) is first estimated using the content of a macroblock $X_{t-1}(s,t)$ from the immediate previous frame t-1. Location of $X_{t-1}(s,t)$ is specified relative to $X_t(i,j)$ by a motion vector (MV) (s-i, t-j). The pixel difference between the estimate $X_{t-1}(s,t)$ and the actual content of the macroblock $X_t(i,j)$ is then intra-coded using a coding technique similar to the Intra coding mode. During actual encoding of macroblock $X_t(i,j)$, macroblock $X_t(i,j)$ is represented in compact binary form. Macroblock $X_t(i,j)$ is differentially encoded for bit-saving. An estimated MV, called predicted motion vector (PMV), is calculated by using MVs of three surrounding macroblocks $X_t(i-1,j)$, $X_t(i-1,j+1)$, $X_t(i,j-1)$, if the three surrounding macroblocks exist. Only the difference between PMV and MV is actually encoded. As a consequence, there exists a dependency between the current macroblock $X_t(i,j)$ and its surrounding macroblocks $X_t(i-1,j)$, $X_t(i-1,j+1)$, $X_t(i,j-1)$.

In the Skip mode, the macroblock of the same location of the previous frame t-1 $X_{t-1}(i,j)$ represents the current macroblock $X_t(i,j)$ of the current frame t and no information of the current macroblock is encoded. In the Inter-4 mode, the current macroblock $X_t(i,j)$ is further divided into four blocks, each of which performs Inter-coding similar to the Inter mode as described above.

Thus, the coding method for each macroblock of a P frame depends on the mode of the macroblock, which is selected from a mode set comprising Intra, Inter, Skip and Inter-4. Selecting the right set of modes for a P-frame involves more than just individually selecting the mode that results in highest visual quality for a macroblock. In particular, the best quality mode may require too many bits to encode, and hence a lower quality that results in a lower number of bits may be necessary. Further, the coding efficiency of a macroblock depends on the mode selection of the macroblock's neighboring blocks. The macroblock mode selection problem thus involves selecting coding modes for a set of macroblocks in a P-frame, taking into consideration the scene activities of the P-frame and the inter-dependencies of neighboring macroblocks, to minimize visual distortion while satisfying a bit rate constraint.

Figure 1:
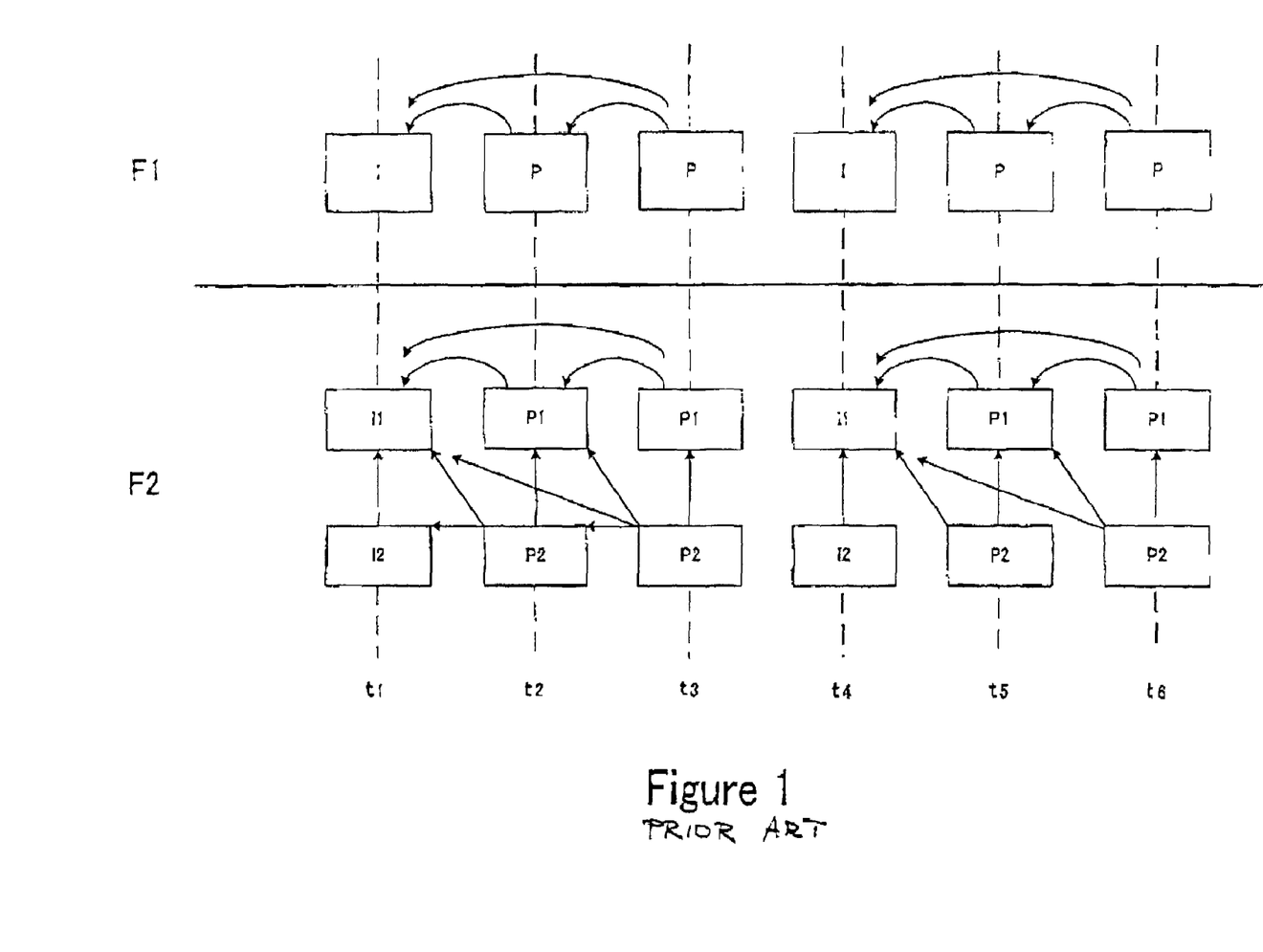
FIG. 1, as previously described, is a block diagram including examples of conventional, prior art mapping of video packets.

Another prior art application of the optimization framework is the mapping of video packets to different network services of varying qualities, as illustrated in FIG. 1. Video packets are often dependent on each other due to differentiated coding of video frames. FIG. 1 includes illustrations of two differentiated coded video formats, F1 and F2. At time t2, for example, video packet P of format F1 depends on video packet I at time t1, while video packet P2 of format F2 depends on video packet P1 at time t2, as well as video packet I1 and I2 at time t1. Given this type of dependency, sending a video packet, x, via a network having a particular quality of service affects the performance of the dependent video packets. The problem is how to map video packets in different modes to different networks having different service qualities to minimize end-to-end visual distortion.

To provide a concrete example, consider the first application of the optimization framework, i.e. the macroblock mode selection problem. Initial consideration is given to the details of the macroblock mode selection problem to outline related work for this problem.

The goal of the macroblock mode selection problem, like other rate-distortion optimization problems, is to minimize the amount of distortion subject to a bit rate constraint. By assuming that the distortion metric is additive, the mode selection problem (that is, selecting the best sequence of modes $M=[M_1, \ldots, M_N]$ for the N macroblocks, where each mode $M_i$ is selected from a mode set $m=\{m_1, \ldots, m_K\}$), can be expressed as follows:

$$\min_M \sum_{i=1}^{N} D_i(M) \; s.t. \sum_{i=1}^{N} R_i(M) \leq R_s \quad (1)$$

where $D_i(M)$ is the resulting distortion of the ith macroblock $MB_i$ having a mode sequence M, $R_i(M)$ is the resulting rate of $MB_i$ having a mode sequence M, and $R_s$ is the bit rate constraint of the frame.

As the constrained problem (1) is difficult to solve, the conventional approach is to solve, instead, the corresponding Lagrangian, expressed as follows:

$$\min_M \sum_{i=1}^{N} D_i(M) + \lambda R_i(M) \quad (2)$$

It can be shown that for a given multiplier $\lambda$, an optional solution $M^O$ to (2) is also an optimal solution to (1) if the following equation (2)' is satisfied.

$$\sum_{i=1}^{N} R_i(M^O) = R_s \quad (2)'$$

If equation (2)' is not satisfied, an appropriate value for $\lambda$ must be derived to drive the sum to $R_s$ while satisfying the inequality of equation (1), since the approximation bound is related to the numeric difference between the sum and $R_s$. A wealth of literature has proposed techniques for finding the appropriate $\lambda$. Such literature includes T. Wiegand et al, "Rate-distortion optimized mode selection for very low bit rate video coding and the emerging h.263 standard." IEEE Trans. on CSVT, April 1996, vol. 6, no.2, and G. Sullivan and T. Wiegand, "Rate-distortion optimization for video compression," IEEE SP Magazine, November 1998.

As discussed earlier, distortion and rate of MB do not directly depend on modes of all the other macroblocks for most video coding standards. In particular, recall that for a P-frame of H.263, a particular predicted motion vector PMV is first calculated for each macroblock using the three neighboring macroblocks of the particular macroblock, if the neighboring macroblocks exist. The actual motion vector for the macroblock is the sum of the particular PMV and the differentially encoded vector for the particular macroblock. This means that $MB_i$ depends directly only on the mode selection of its three neighboring macroblocks. This is discussed in ITU-T Recommendation H.263, Video Coding for Low Bit rate Communication, February 1998.

The above mentioned paper by T. Wiegand et al. as well as "Combined mode selection and macroblock quantization step adaptation for the h.263 video encoder", D. Mukherjee and S. Mitra, ICIP, 1997 have assumed that this dependency is too complex and made the following simplifying assumption to ease the optimization. The rate and distortion of $MB_i$ depend only on the mode of at most one other macroblock, typically the left neighboring macroblock. With this assumption, and assuming that the macroblocks are numbered from left to right, and top to bottom, the expression (2) simplifies to:

$$\min_M \sum_{i=1}^{N} D_i(M_{i-1}, M_i) + \lambda R_i(M_{i-1}, M_i) \quad (3)$$

The main benefit of using this assumption is that a single dependency relationship leads simply to a special state transition diagram (SD) or trellis, and the Viterbi algorithm can be used to find the optimal solution to (3) by finding the least cost path having a length N through the trellis.

While this approach is efficient, it is optimal only for the specific case of the dependency being singular. In video coding, multi-dependency exists between macroblocks, as discussed earlier.

Another existing approach is more general, but is computationally complex as it includes an exhaustive search through all possible combinations of modes. This approach fails to capitalize on the loosely coupled nature of the dependency, making the computation more complex than necessary. For example, the order of complexity of the exhaustive search for a doubly dependent decision, where each mode selection depends on two other selection, is an exponential function of the size of the input: $O(K^N)$.

Thus, there is a need for an efficient mode optimizer that can work for the multiple dependencies. The mode optimizer needs to have significantly less computational complexity than the exhaustive search approach.

SUMMARY OF THE INVENTION

In accordance with one aspect of the invention, a method is provided for optimizing mode selection for video coding that requires a sequence of decisions with respect to a sequence of blocks of data. Each of such decisions is selected from a set of modes. The sequence of decisions can be expressed in a directed acyclic dependency graph with depender blocks pointing to dependee blocks. In the present specification, drawings and claims, the term "graph" has the same meaning as "graph" in "graph theory" in mathematics. That is, a graph includes nodes and edges. Each edge connects two nodes. In the drawings accompanying the specification, the rectangles represent nodes and the arrows connecting pairs of the rectangles represent edges. The dependency graph is numbered in a reverse topological order. A state transition diagram, preferably a trellis, is constructed from the reverse topologically ordered dependency graph. The least cost path through the trellis is determined. The least cost path defines the optimal decision modes selected from the set of modes at respective blocks.

The trellis includes as many stages as there are decisions in the dependency graph in an order from left to right. Each stage of the trellis has a varying number of states corresponding to cardinality of the set of modes for the decision and the number of decisions to one side of the stage that the stage needs to remember for decisions to the other side of the stage.

The optimal mode sequence is selected by finding the shortest path from any state in the lowest number stage (stage 1) to any state in the highest number stage (stage N). In one embodiment, the Viterbi algorithm is applied to the trellis to determine the least cost path through the trellis. The sequence of blocks of data is typically a sequence of macro blocks of a H.263 frame. However, the invention is more general and can be applied to other video encoding, such as MPEG-1, MPEG-2 and MPEG-4.

DETAILED DESCRIPTION OF FIGS. 2-6

In video coding, a sequence of decisions needs to be made. Each decision is selected from a finite set of "modes." The performance of each decision depends on the corresponding selected mode for the decision, as well as the modes of a subset of other decisions.

Figure 2:
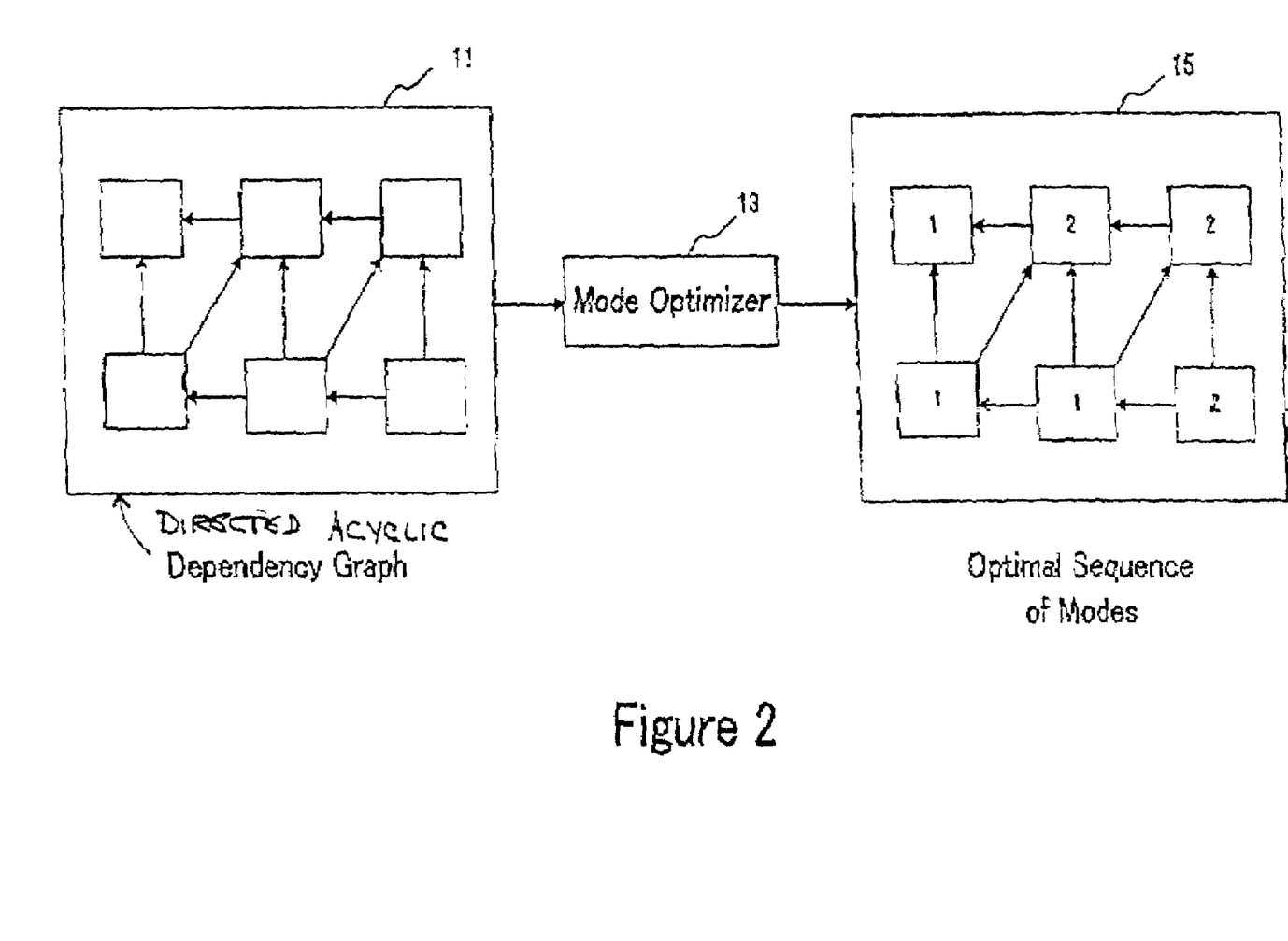
FIG. 2 is a block diagram including a general sequence of a process according to one embodiment of the present invention.
Figure 4:
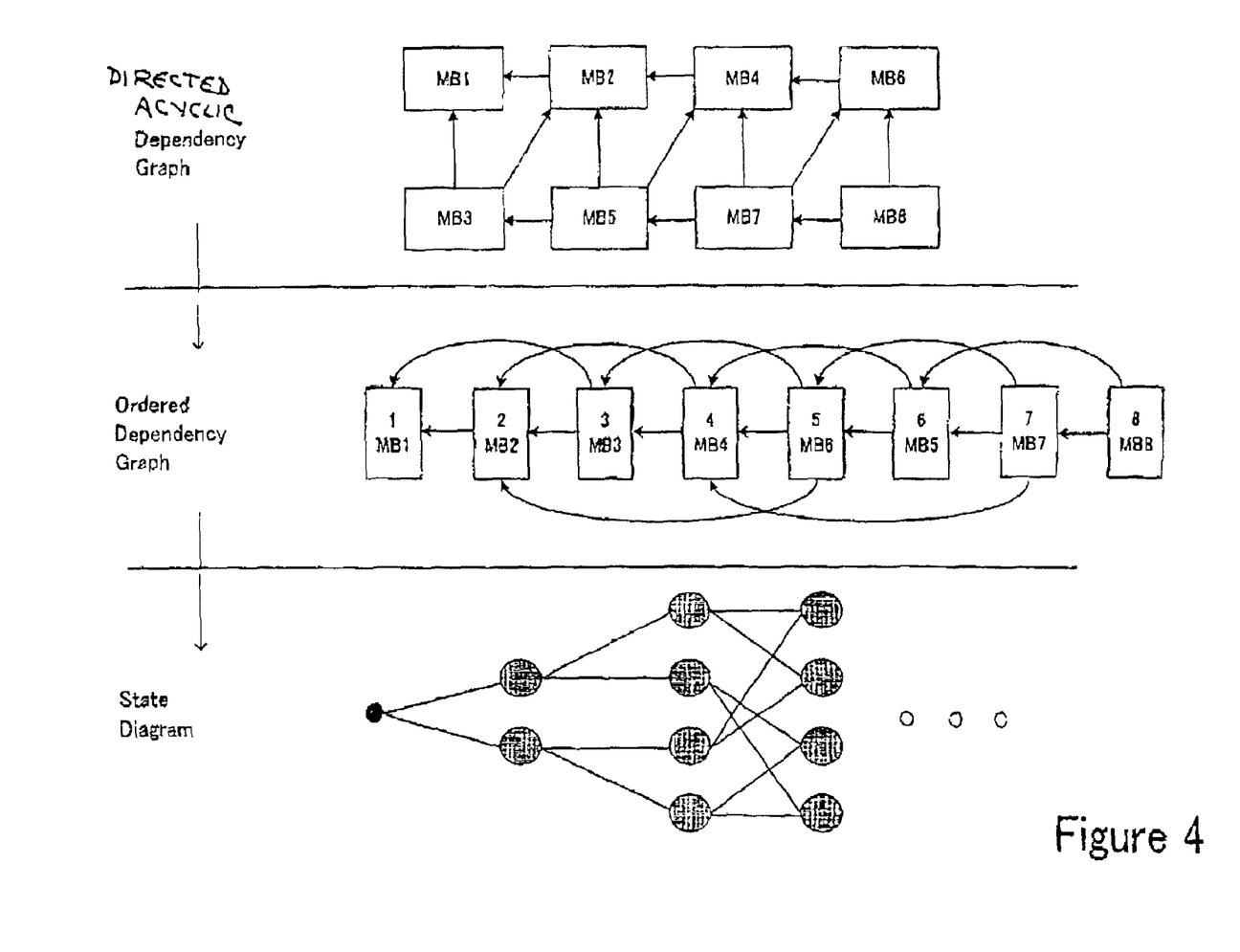
FIG. 4 includes a block diagram and a state diagram of an optimizing algorithm according to another embodiment of the present invention.

In FIG. 2, the dependency of each video coding decision is expressed as a directed acyclic graph that is represented by block 11. Block 11, a schematic view of a directed acyclic dependency graph, provides a general idea of the operation of a dependency graph. An actual example of a dependency graph that can be used in the acyclic dependency graph forming block 11 is shown in FIG. 4. The rectangles in the dependency graphs, e.g., the rectangles within the graph represented by block 11, represent macroblocks (MB). The macroblocks of directed acyclic dependency graph 11 are labeled MB1, MB2 . . . MB8 in the directed acyclic dependency graph of FIG. 4. The dependency graphs of the drawings are "directed" because operations between the macroblocks of the graphs are unidirectional, as indicated by the arrows between the rectangles representing the macroblocks. The directed dependency graphs of the drawings which are acyclic do not include loops and never repeat; i.e., if one starts at any arbitrary node (e.g., as indicated by one of the rectangles in block 11) in the dependency graph and proceeds by following the edges, as indicated by the arrows, one can not return to the start node. Macroblocks in graph 11 associated with "depender" and "dependee" decisions are respectively represented by first and second rectangles that are connected together by an arrow, such that the point of the arrow is at the depender macroblock. Thus, a "dependee" decision block points to a "depender" decision block as shown by the arrows.

Figure 3:
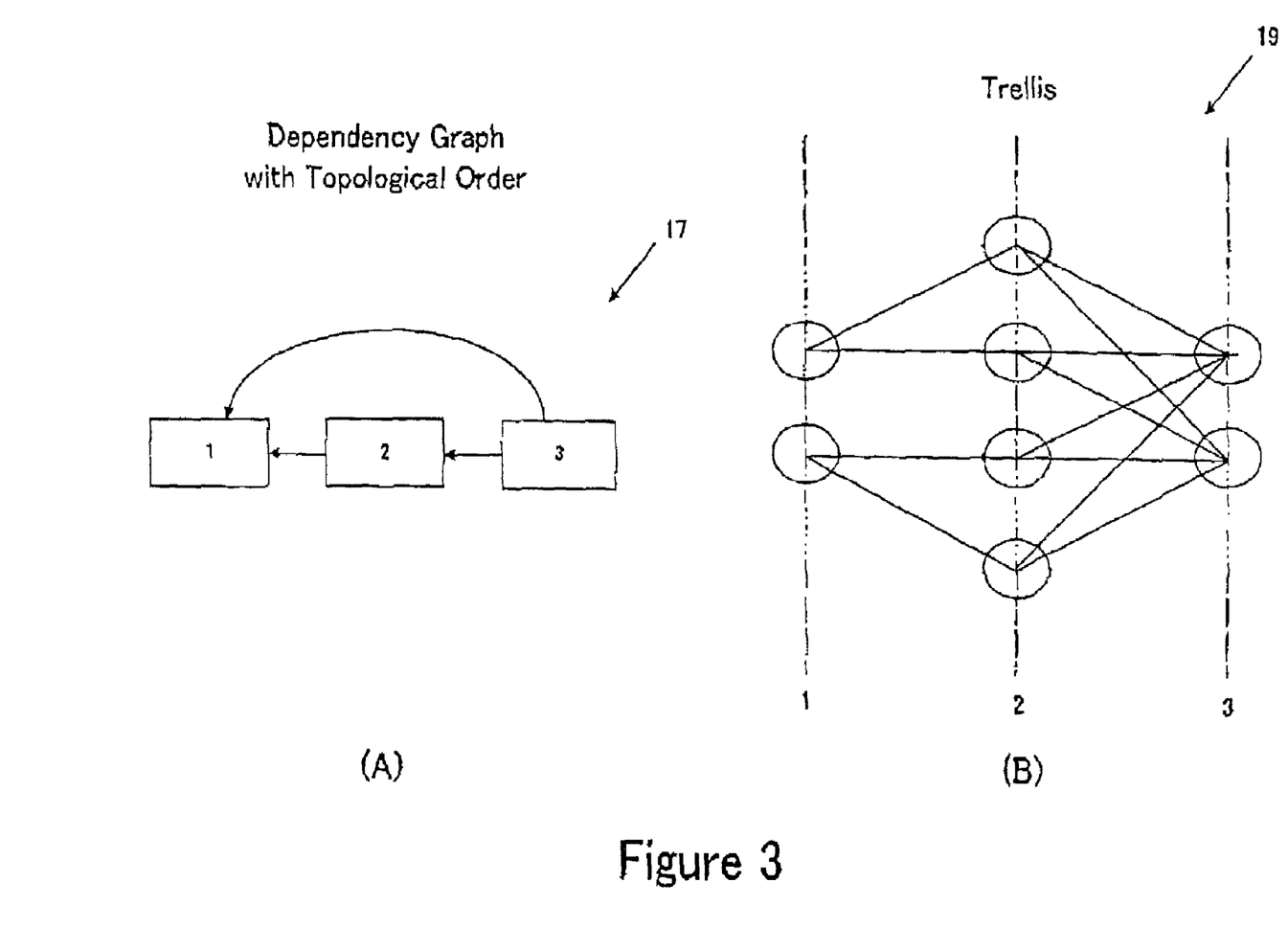
FIG. 3 includes a block diagram and a state diagram of an optimizing algorithm according to one embodiment of the present invention.

A mode optimizer 13, of the type illustrated in FIG. 3 or FIG. 4, efficiently enumerates the loosely dependent set of choices resulting from directed acyclic dependency graph 11 and outputs an optimal sequence of modes that is shown in block 15. The input to the optimizer 13 is the output of dependency graph 11 that specifies the dependencies of the video coding decisions. Each decision made by using graph 11 has a finite set of choices, i.e., a mode set, which in the case of the macroblocks of an H.263 P-frame is {Intra, Inter, Skip, Inter-4}. Mode optimizer 13 includes an evaluation function that determines the performance of a decision based on its decided mode and the modes of the corresponding decisions. The output of the optimizer 13 is the optimal mode assignment for each decision as shown in block 15. For example, in the case of macroblocks of H.263, "1" in block 15 indicates "Intra" mode while "2" indicates "Inter" mode.

Referring to FIG. 3, an optimizing algorithm that optimizer 13 can perform is as follows. The optimizer of FIG. 3 first orders and numbers all decisions in the dependency graph 11 using a numbering scheme, one example of which is described infra. The numbering must be in a reverse topological order, i.e., if there is an edge from a node x to a node y, the label of node x must be larger than the label of node y. The fact that the dependency graph 11 is a directed acyclic graph guarantees the existence of such a numbering scheme. FIG. 3(A) includes a portion of such a dependency graph with a topological order generated from the dependency graph 11 of FIG. 2.

As indicated in FIG. 3(B), mode optimizer 13 constructs a data structure called a trellis 19, that has as many stages as there are decisions in the ordered dependency graph 17. The stages of trellis 19 are ordered from left to right with the assigned numbering so that the left most stage is number 1 and the right most stage is number N. Each stage has a varying number of states, corresponding to the cardinality of the mode set for that decision and the number of decisions to the left of a particular stage that the particular stage needs to remember for decisions to the right of the particular stage. There are edges connecting states of neighboring stages that reflect the cost of a mode assignment as defined by the connected states. The mode optimizer 13 finds the shortest path from any state in the left-most stage to any state in the right-most stage. The shortest path thus found corresponds to the optimal sequence of modes for the sequence of decisions.

A particular application of mode optimizer 13, for the MB mode selection problem, is now described. Optimal MB mode selection for video coding is important in minimizing visual distortion for a bit rate constraint. Mode optimizer 13 is general enough that it can probably be applied to most present and future segmentation or multi-mode based video coding standards.

By viewing dependency graph 11 as a directed acyclic graph (DAG) and exploiting the properties of the DAG, multiple dependencies during optimization should not be too computationally complex.

Because a multiple-MB dependency relationship can still lead to a state diagram that is a DAG, a Viterbi algorithm can be used to solve the shortest path problem. A procedure to construct a corresponding state diagram given the multiple-MB relationship is discussed hereafter step-by-step.

Reverse Topological Sort

If a differentially coded block based syntax, such as H.263, is employed, a dependency graph (DG) is constructed. The dependency graph shows how each MB is directly dependent on the coded information of its neighboring MBs. For a running example, in the dependency graph of FIG. 4, $MB_3$ directly depends on the coded information of $MB_1$ and $MB_2$. In general, a DG forms a partial order. The ordering indicates the set of MBs that is first encoded before a given MB due to differential coding.

Since a DG is a partial order, it is also a DAG. A cycle would mean one half of the MBs must precede the other half and vice versa, which is illogical. In the DAG, labels 1 . . .

N are assigned to the N nodes in a DAG with nodes V and edges E such that the following property is satisfied for all nodes:

$$\forall i,j \in V, \text{ if } \exists (i,j) \in E, \text{ then } i > j \qquad (4)$$

An order that satisfies the property of expression (4) is called a reverse topological order. Specifically, if there is a directed edge from node i to node j, label i must be larger than label j. Essentially the partial order is mapped to a total order without violating the original ordering rules of the partial order. An example of a reverse topological sort algorithm is as follows:

initialize n:=1
initialize S: S is initialized to a set of nodes in V with no outgoing edges.
while S≠∅, (i.e., S is not an empty set),
>select i∈S & remove it from S.
>remove ∀(j,i)∈E, j∈V.
>for all nodes in V with no outgoing edges, add to S.
>label i∈V as n. n++.

With the above algorithm, the following is done. First, identify all nodes in the graph that have no outgoing edges. Select one node in this set and label it "1." Remove all edges terminating at this node "1." Again, identify all unlabeled nodes in the graph with no outgoing edges. Select one node in this set and label it "2." Remove all edges terminating at this node "2." Repeat this procedure until all nodes are labeled, i.e., perform a while loop.

Notice that in step 1 of the while loop, the algorithm does not specify the criterion of node selection in S. In fact, any selection would be a valid reverse topological order. A particular optimization criterion is discussed infra in the section entitled "Complexity Consideration." After assigning the labels, the MBs can be redrawn from left to right in reverse topological order. Such a graph is named an ordered dependency graph (ODG). FIG. 4 includes a diagram of the ODG for the running example. The edges all point from right to left, a consequence of a valid reverse topological sorting operation.

ODG to State Diagram

By redrawing the MBs in a straight line, as indicated by the ODG of FIG. 4, the ODG should remind the reader of the single MB dependency assumption in which an MB depends only on the left MB. In that case, the optimal mode selection problem is solved by first drawing a special SD, a trellis, that corresponds to the associated DG with N stages corresponding to the N MBs. Each stage in the trellis has as many states as there are modes, K. Each trellis stage has K×K edges that connect the states between two consecutive stages. The cost of traversing each edge $(M_{i-1}, M_i)$ between two states in the trellis is the Lagrangian cost of going from mode $M_{i-1}$ of stage i−1 to mode $M_i$ of stage i, i.e. cost equals $D_i(M_{i-1}, M_i)+\lambda R_i(M_{i-1}, M_i)$ in the previously described expression (3). The Viterbi algorithm is then used to find the shortest path in the trellis.

Drawing Nodes in SD

A simple trellis is insufficient to represent the possible state transitions necessary to optimize mode selection for video coding. This is due to the multiple MB dependencies required to optimize mode selection for video coding. For example, in FIG. 4, $MB_3$ depends on both $MB_1$ and $MB_2$, meaning that K incoming edges for each state in stage 3 are not enough to represent all possible mode combinations of $MB_1$ and $MB_2$. To overcome this limitation, the number of states in the stage 2 is increased to $K^2$ so that the mode used in stage 1 can be preserved. The state diagram, SD, in FIG. 4 shows the case when K=2. Each edge $((M1, M2), M3)$ now carries the following Lagrangian cost:

$$D_3(M_1, M_2, M_3)+\lambda R_3(M_1, M_2, M_3) \qquad (5)$$

An important observation is that since there are no outgoing edges from $MB_1$ in the ODG that occur beyond $MB_3$ in ODG, there is no need to preserve the mode used in stage 1 after stage 3 in SD. More generally, the number of states for each stage in SD is determined as follows.

Each stage i has to permute all the mode combinations of a set of stages $h_i=\{h_{i,1} \ldots, h_{i,|h_i|}\}$ where $h_i$ is the memory of stage i. The cardinality of memory $h_i$ is $|h_i|$. Each combination of modes is represented by a state, and hence each stage has $K^{|h_i|}$ states. The memory of stage 1, $h_1$, is initialized to $\{MB_1\}$, i.e. the first memory $h_1$ is initialized to just the first MB. To find $h_i$ for i>1, the following rules are applied in increasing order in i.

Rule 0: Initialize $h_{i+1}$, to $h_1$, by adding $MB_{i+1}$, and subtracting $MB_i$.

Rule 1: If there are incoming edges to $MB_i$ in ODG from MBs other than $MB_{i+1}$, add $MB_1$ to $h_{i+1}$.

Rule 2: If the destination of an outgoing edge from $MB_{i+1}$, e.g., $MB_j$, has no incoming edge to $MB_j$ beyond $MB_{i+1}$, subtract $MB_j$ from $h_{i+1}$.

Using this procedure, the prescribed memories $h_i$, are determined, which enables the number of states in each stage i to be determined.

Drawing Edges in the State Diagram SD

To complete the state diagram SD, the states between two neighboring stages in SD with directed edges are connected in a way that modes of specified past stages are preserved. Towards that goal, the following SD Edge Construction Procedure is performed:

First, label states in each stage i top to bottom with a number having a base K and $|h_i|$ digits; the digits have a numerical value from 0 to $K^{|h_i|}-1$. The number having the base K represents a particular permutation of modes in set $h_i$. For each state x in stage i, draw an edge to a state y in stage i−1 if the mode permutation reflected in the label of state x matches the permutation reflected in the label of state y.

By match, is meant that the permutation of state x of modes in $h_i$\MBi ($h_i$\MBi means the set $h_i$ without $MB_i$) is the same as the permutation of state y. Matching is performed by checking the digit in each of the labels of state x with each of the labels of state y, wherein the labels that correspond to the same past stage mode are the same. Each $MB_j$ in $h_i$MBi must also be permuted in stage i−1 by the node construction procedure.

Figure 5:
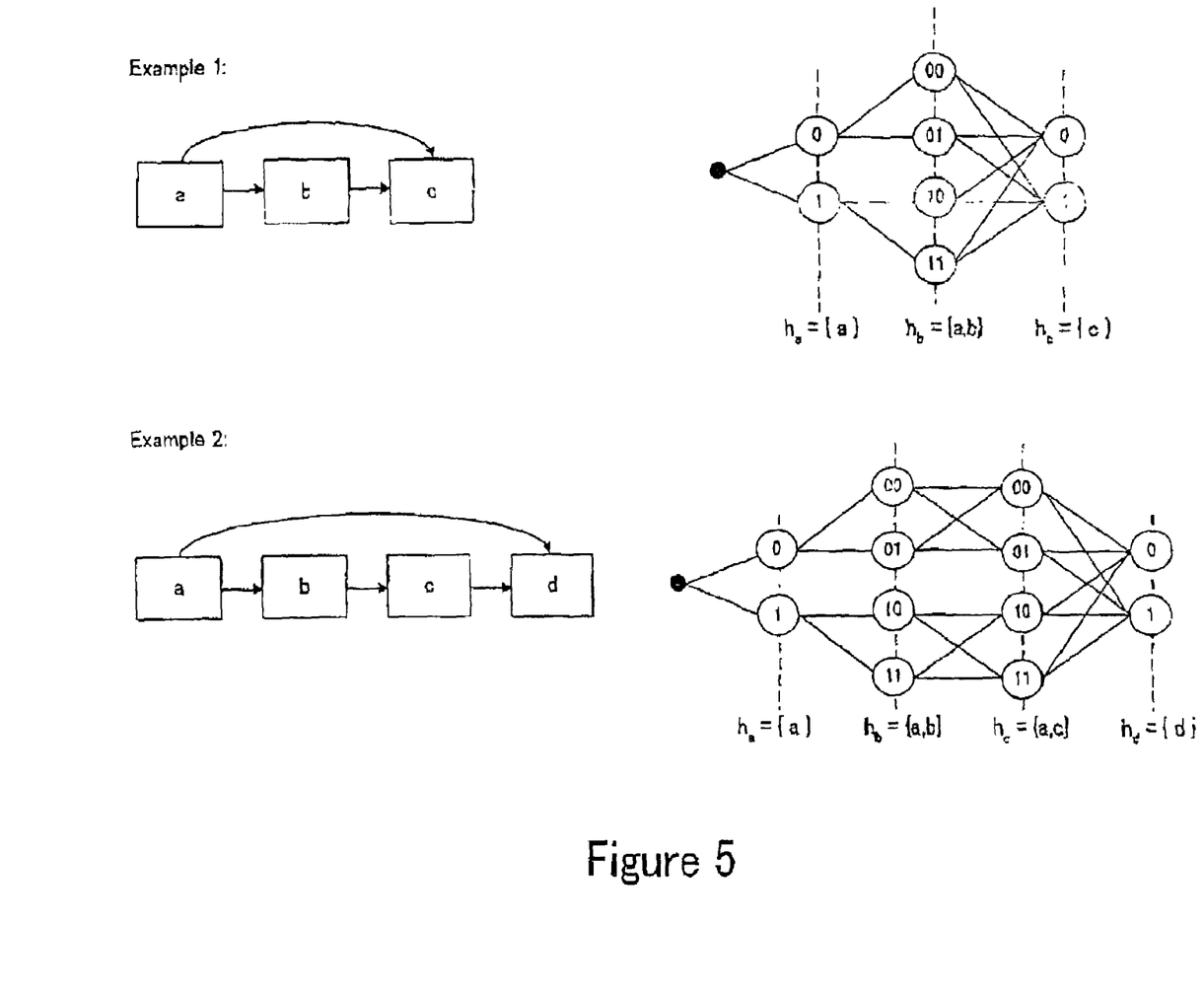
FIG. 5 includes block diagrams and state diagrams of structures of a trellis generated from different ordered dependency graphs.

FIG. 5 includes illustrations of two examples of SDs from ODGs. The node labels in ODGs are in alphabets to avoid confusion. In both cases, K=2, and the number labels for the states are the binary numbers inside the nodes. The state diagram at the bottom of FIG. 4 shows the SD corresponding to the running example.

After the SD is constructed, a Viterbi programming algorithm is used to find the shortest path of length N through the SD to find the optimal mode selection for the N MBs.

Complexity Consideration

After constructing the SD using the above described procedure, computational complexity can be determined. To determine computational complexity, it is necessary to initially compute the running time of the dynamic programming algorithm used to find the least-cost path through the state diagram SD. For each state in stage i of SD, find the shortest path to that state from a maximum of $K^{|h_{max}|}$ states in stage i−1, where $h_{max}=\arg\max_{i=1,N}|h_i|$. Since the maximum number of states in stage i is the same, and there are N stages, the running time is $O(N\ K^{2|hmax|})$.

To reduce the complexity of the algorithm, an attempt is made to minimize $|h_{max}|$, since N and K are given parameters of the problem instance. Recall from the section of Reverse Topological Sort that in step 1 of the while loop of the reverse topological sort, any nodes with no outgoing edges (any nodes in S) can be selected as the next node to be labeled without violating the reverse topological order. This degree of freedom is exploited in an attempt to minimize $|h_{max}|$. The value of $|h_{max}|$ is minimized by selecting a node in S at iteration i of the loop that yields the minimum number of stages for stage i. For the running example in FIG. 4, selecting $MB_4$ when i=3 would lead to $|h_3|=3$, while selecting $MB_3$, as shown in the figure, leads to $|h_3|=2$.

If the complexity of the algorithm remains too high even after the proposed node selection in topological sorting operations has been used, the complexity is reduced further at a cost of a decrease in coding performance. For H.263, the complexity is reduced by decreasing the number of MB rows that are being optimized at a time.

Results

Figure 6:
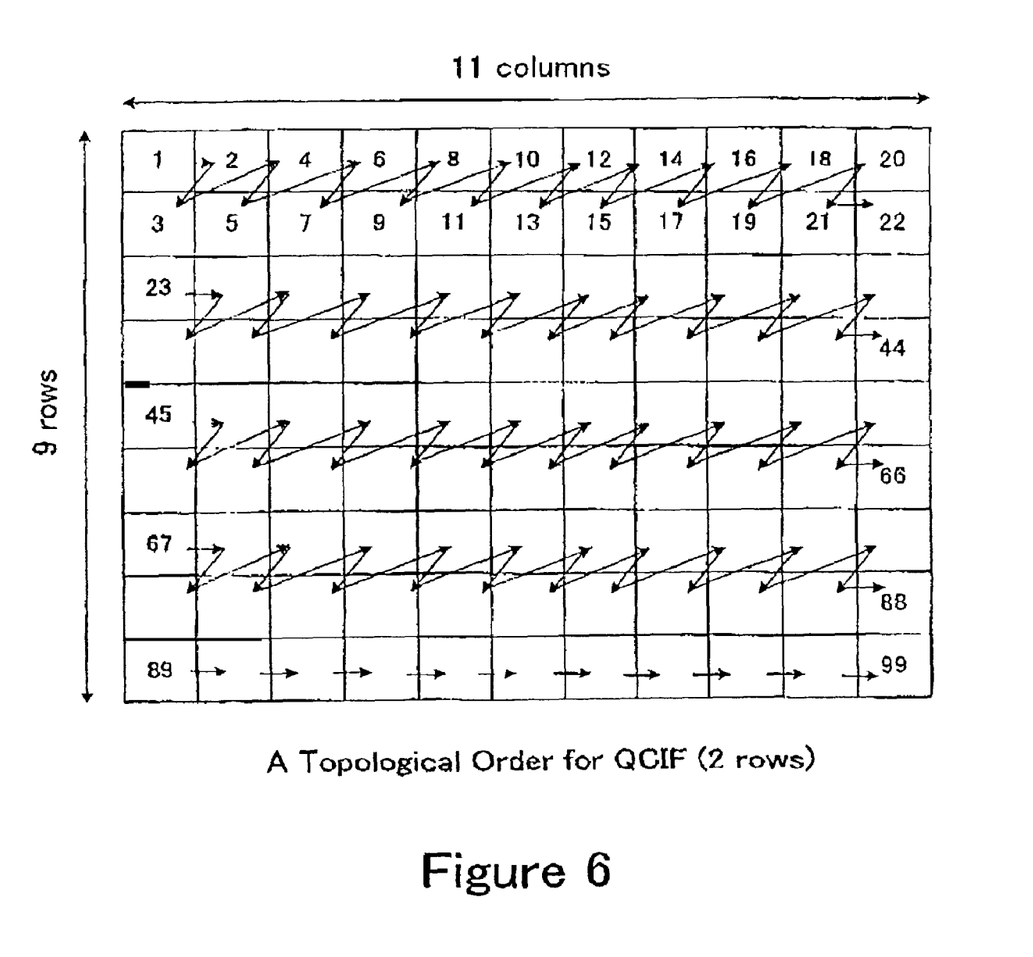
FIG. 6 is a diagram of a topological order for QCIF.

To test the effectiveness of the proposed optimization, the modified topological sort algorithm was applied to the DG of MBs of QCIF size to obtain an ODG. Two MB rows were optimized at a time. The dependency pattern was the same as the one shown in the DG of FIG. 4. The result is the ODG shown in FIG. 6.

The coding efficiency of the algorithm disclosed herein was compared to the TMN10 implementation developed by the University of British Columbia and to the results of T. Wiegand et al. as described in the above mentioned paper. The test was done for a car phone sequence. Mode selection in T. Wiegand et al. is the same as the base case of the optimization disclosed herein when the number of MB rows being optimized is fixed at "1". Tests were performed at 38 kbs, 76.5 kbs and 126 kbs, with quantizer step size fixed at 10, 6 and 4 respectively for I and P frames. The frame rate was chosen to be 10 frames per second, and an intra refresh mode was periodically forced into the selection every 12 frames for every MB. The results in luminance PSNR are shown in the following table, where "Proposed" refers to the present disclosure. The table indicates the technique disclosed herein has up to 0.32 dB improvement over TMN10 and 0.03 dB improvement over T. Wiegand et al.

|  | TMN10 | Wiegand96 (1 MB row) | Proposed (2 MB rows) |
| --- | --- | --- | --- |
| Car phone (38 kbps) | 33.84 dB | 33.97 dB | 34.00 dB |
| Car phone (76.5 kbps) | 37.03 dB | 37.24 dB | 37.25 dB |
| Car phone (126 kbps) | 39.92 dB | 40.21 dB | 40.24 dB |

The disclosed optimization is believed to be fundamentally more general than the TMN10 and Wiegand96 approaches, and hence can be more flexibly applied in a more general coding setting, such as for arbitrarily shaped video objects, as seen in multiple-VOP mode in MPEG4.

The video coding operations associated with FIGS. 2-6 are performed by a digital data processor, i.e., a computer, having a memory storing a program for instructing the processor to perform the described coding operations.

While the invention has been described with respect to specific embodiments, the scope of the invention is not limited to such embodiments.

I claim:

1. A method of optimizing mode selection for video coding blocks created by dividing video frames into multiple segments, comprising:
    generating a directed acyclic dependency graph with depender blocks pointing to dependee blocks based upon an inputted sequence of blocks;
    outputting a loosely dependent set of mode choices;
    inputting the loosely dependent set of mode choices generated by the directed acyclic dependency graph to an optimizer module operable to enumerate the loosely dependent set of mode choices; and
    outputting an optimal mode assignment for each block;
    wherein enumerating the loosely dependent set of mode choices comprises:
    numbering the dependency graph in a reverse topological order,
    constructing a state transition diagram from the topologically ordered dependency graph, and
    determining the least cost path through the state transition diagram,
    wherein said state transition diagram is a trellis that includes as many stages as there are decisions in the dependency graph.

2. The method according to claim 1, wherein each stage of the trellis has a varying number of states corresponding to cardinality of the set of mode choices for the decision and the number of decisions to one side of the stage that the stage needs to remember for decisions to the other side of the stage.

3. The method according to claim 2, wherein the Viterbi algorithm is applied to the trellis to determine the least cost path through the trellis.

4. A system for optimizing mode selection for video coding requiring a sequence of decisions with respect to a sequence of macroblocks, said macroblocks being created by dividing respective video frames to be video coded into multiple sections, each decision being selected from a set of modes, each mode representing a method of coding a macroblock, the selection being made in response to a directed acyclic dependency graph with depender macroblocks pointing to dependee macroblocks, comprising:
    a processor arrangement for (a) numbering the directed acyclic dependency graph in a reverse topological order, (b) constructing a state transition diagram from the topologically ordered dependency graph, and (c) determining the least cost path through the state transition diagram, the least cost path defining optimal decision modes selected from said set of modes at respective macroblocks,
    wherein said state transition diagram is a trellis, said trellis comprising as many stages as there are decisions in the dependency graph.

5. The system according to claim 4, wherein each stage of the trellis has a varying number of states corresponding to both a cardinality of the set of modes for the decision and a number of decisions to one side of the stage that the stage needs to remember for decisions to the other side of the stage.

6. The system according to claim 5, wherein the Viterbi algorithm is applied to the trellis to determine the least cost path through the trellis.

7. A memory arrangement for enabling a processor arrangement to optimize mode selection for video coding which requires a sequence of decisions with respect to a sequence of macroblocks, said macroblocks being created by dividing respective video frames to be video coded into multiple sections, each decision being selected from a set of modes, each mode representing the method of coding a macroblock, the selection being made in response to a directed acyclic dependency graph with depender macroblocks pointing to dependee macroblocks, the memory arrangement comprising a program for causing the processor arrangement to (a) number the directed acyclic dependency graph in a reverse topological order, (b) construct a state transition diagram from the topologically ordered dependency graph, and (c) determine the least cost path through the state transition diagram, the least cost path defining optimal decision modes selected from said set of modes at respective macroblocks; wherein said state transition diagram is a trellis, said trellis comprising as many stages as there are decisions in the dependency graph.

8. The memory arrangement according to claim 7 wherein each state of the trellis has a varying number of states corresponding to a cardinality of the set of modes for the decision and a number of decisions to one side of the stage that the stage needs to remember for decisions to the other side of the stage.

9. The memory arrangement according to claim 8 wherein the memory arrangement stores a Viterbi algorithm, the program being arranged for causing the processor arrangement to apply the Viterbi algorithm to the trellis to determine the least cost path through the trellis.

* * * * *